US012749695B2

(12) United States Patent
Choi

(10) Patent No.: US 12,749,695 B2
(45) Date of Patent: Sep. 29, 2026

(54) HYDROGEN LEAK SENSING DEVICE AND METHOD FOR FUEL CELL VEHICLE

(71) Applicants: Hyundai Motor Company, Seoul (KR); Kia Corporation, Seoul (KR)

(72) Inventor: Hae Pin Choi, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/873,019

(22) Filed: Jul. 25, 2022

(65) Prior Publication Data

US 2023/0187666 A1 Jun. 15, 2023

(30) Foreign Application Priority Data

Dec. 10, 2021 (KR) ........................ 10-2021-0177076

(51) Int. Cl.

*H01M 8/04664* (2016.01)
*G01M 3/32* (2006.01)
*H01M 8/04302* (2016.01)

(52) U.S. Cl.

CPC ..... *H01M 8/04679* (2013.01); *G01M 3/3236* (2013.01); *H01M 8/04302* (2016.02); *H01M 2250/20* (2013.01)

(58) Field of Classification Search

CPC ........................ H01M 8/04082–04089; H01M 8/04223–04228; H01M 8/04298–04328; H01M 8/0438–04388; H01M 8/0444–04447; H01M 8/04664; H01M 8/04686; H01M 8/04701–04708; H01M 8/04746–04753; H01M 8/04791–04798; G01M 3/00–002; G01M 3/32; G01M 3/3236; G01M 3/3254; G01M 3/3263; G01M 3/3272

See application file for complete search history.

(56) References Cited

U.S. PATENT DOCUMENTS 6,467,466 B1 * 10/2002 Maekawa ............ F02D 19/021 123/529
8,020,430 B2 9/2011 Farnsworth
10,598,564 B2 3/2020 Cho et al.
(Continued)

FOREIGN PATENT DOCUMENTS

CN 111678658 A 9/2020
JP 2005-249708 A 9/2005
(Continued)

OTHER PUBLICATIONS

Cha, S (2016). Fuel cell Fundamentals. (3rd ed.) (pp. 272-294, 346, 431-449). (Year: 2016).*
(Continued)

*Primary Examiner* — Nicole M. Buie-Hatcher
*Assistant Examiner* — Jacob Buchanan
(74) *Attorney, Agent, or Firm* — Fox Rothschild LLP

(57) ABSTRACT

In one aspect, disclosed are a hydrogen leak sensing device and method for a fuel cell vehicle. The device comprises a processor configured to control a valve of a hydrogen tank, wherein the processor may calculate a state of fuel (SOF) of the hydrogen tank when the valve is closed and a SOF of the hydrogen tank when the valve is opened, and determine whether hydrogen leak has occurred based on the calculated SOFs.

13 Claims, 5 Drawing Sheets

(56) References Cited

U.S. PATENT DOCUMENTS

| | | | | |
|---|---|---|---|---|
| 2003/0215681 | A1* | 11/2003 | Appt | B60L 58/34 429/444 |
| 2005/0171677 | A1* | 8/2005 | Gottwick | H01M 8/04664 701/102 |
| 2007/0298289 | A1* | 12/2007 | Clingerman | H01M 8/04955 429/444 |
| 2012/0305430 | A1* | 12/2012 | Jaeger | H01M 8/04201 206/459.1 |
| 2014/0093801 | A1* | 4/2014 | Rogahn | H01M 8/04303 429/429 |
| 2017/0010178 | A1* | 1/2017 | Cho | G01M 3/26 |
| 2018/0034078 | A1* | 2/2018 | Kawase | H01M 8/04619 |
| 2019/0190045 | A1* | 6/2019 | Suh | G01K 15/007 |

FOREIGN PATENT DOCUMENTS

| | | | | |
|---|---|---|---|---|
| JP | 2006-179469 A | | 7/2006 | |
| JP | 2006278088 A | * | 10/2006 | |
| KR | 10-2006-0072665 A | | 6/2006 | |
| KR | 10-0815308 B1 | | 3/2008 | |
| WO | WO-2006033426 A1 | * | 3/2006 | H01M 8/04947 |

OTHER PUBLICATIONS

Machine translation of Suematsu, JP-2006278088-A. Originally available Oct. 12, 2006. (Year: 2006).*

Machine translation of Yoshida, WO-2006033426-A1. Originally available Mar. 30, 2006. (Year: 2006).*

H.-K. Kim, Y.-M. Choi, S.-H. Kim, J.-H. Shim, and I.-C. Hwang, "The Evaluation of Hydrogen Leakage Safety for the High Pressure Hydrogen System of Fuel Cell Vehicle," Transactions of the Korean hydrogen and new energy society, vol. 23, No. 4. The Korean Hydrogen and New Energy Society, pp. 316-322, Aug. 31, 2012, with English translation.

* cited by examiner

HYDROGEN LEAK SENSING DEVICE AND METHOD FOR FUEL CELL VEHICLE

CROSS-REFERENCE TO RELATED APPLICATION

This application claims under 35 U.S.C. § 119(a) the benefit of Korean Patent Application No. 10-2021-0177076, filed in the Korean Intellectual Property Office on Dec. 10, 2021, the entire contents of which are incorporated herein by reference.

BACKGROUND

Technical Field of the Disclosure

The present disclosure relates to a hydrogen leak sensing device and method for a fuel cell vehicle.

Background

A fuel cell vehicle drives a motor using electricity obtained by reacting hydrogen with oxygen in an air. A fuel cell system, a motor, a battery and a hydrogen storage system are mounted inside this fuel cell vehicle. When a hydrogen leak has occurred in the hydrogen storage system while power is supplied to the vehicle and a controller, the fuel cell vehicle detects the hydrogen leak based on a combination of signals from a hydrogen leak sensing sensor and a peripheral electronic device to ensure safety.

However, an existing hydrogen leak sensing scheme cannot detect the hydrogen leak though the hydrogen leak has occurred unless the vehicle and the controller are powered. Further, after the hydrogen leak is terminated due to an irreversible phenomenon, even when power is supplied to the controller, the hydrogen that has already leaked may not be detected.

SUMMARY OF THE DISCLOSURE

The present disclosure has been made to solve the above-mentioned problems occurring in the existing technologies while advantages achieved by the existing technologies are maintained intact.

One aspect of the present disclosure provides a hydrogen leak sensing device and method for a fuel cell vehicle that may sense a hydrogen leak when power is not supplied to a controller of a hydrogen storage system.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a hydrogen leak sensing device for a fuel cell vehicle comprises a processor configured to control a valve of a hydrogen tank, wherein the processor is configured to calculate a state of fuel (SOF) of the hydrogen tank when the valve is closed and a SOF of the hydrogen tank when the valve is opened, and determine whether hydrogen leak has occurred based on the calculated SOFs.

The device may further comprise a detector configured for detecting hydrogen state information using at least one of a temperature sensor, a pressure sensor, a mass sensor, or a flow sensor.

The processor may be configured to calculate the SOFs using a temperature and a pressure of hydrogen measured by the temperature sensor and the pressure sensor.

The processor may be configured to calculate the SOFs using a mass of hydrogen measured by the mass sensor.

The processor may be configured to calculate the SOFs based on a temperature change according to a flow of hydrogen sensed by the flow sensor.

The processor may be configured to calculate a first SOF when the valve is closed and store the first SOF, determine whether a hydrogen storage system and the vehicle satisfy a diagnosis start condition when the valve is opened, and upon determination that the diagnosis start condition is satisfied, calculate a second SOF and store the calculated second SOF.

The processor may be configured to determine that the diagnosis start condition is satisfied when there is no failure in the valve and the sensor, when the SOF of the hydrogen tank is equal to or greater than a predetermined reference fuel amount, and when a parking time duration is within a predetermined parking time duration.

The processor may be configured to compare the first SOF with the second SOF, and diagnose that the hydrogen leak has occurred when a difference between the first and second SOFs is greater than or equal to a predetermined reference value.

The processor may be configured to compare the first SOF with the second SOF, and diagnose that the hydrogen leak has occurred when a ratio between the first SOF and the second SOF is smaller than or equal to a predetermined ratio.

The processor may be configured to output a warning upon determination that the hydrogen leak has occurred, and when outputting the warning, display a failure code on a display and inhibit a fuel cell system from starting.

According to an aspect of the present disclosure, a hydrogen leak sensing method for a fuel cell vehicle comprises calculating, by a processor configured therefore, a SOF of a hydrogen tank when a valve of the hydrogen tank is closed and a SOF of the hydrogen tank when the valve of the hydrogen tank is opened, and determining, by the processor, whether hydrogen leak has occurred based on the calculated SOFs.

Calculating the SOFs may comprise detecting, by the processor configured therefore, a temperature and a pressure of hydrogen, and calculating, by the processor, the SOFs using the temperature and the pressure of the hydrogen.

Calculating the SOFs may comprise detecting, by the processor configured therefore, a mass of hydrogen, and calculating, by the processor, the SOFs using the mass of hydrogen.

Calculating the SOFs may comprise detecting, by the processor configured therefore, a flow of hydrogen, and calculating, by the processor, the SOFs based on a temperature change according to the flow of hydrogen.

Calculating the SOF may comprise calculating and storing, by the processor configured therefore, a first SOF when the valve is closed, determining, by the processor, whether a hydrogen storage system and the vehicle satisfy a diagnosis start condition when the valve is opened, and calculating and storing, by the processor, a second SOF when the diagnosis start condition is satisfied.

The determining of whether the hydrogen storage system and the vehicle satisfy the diagnosis start condition may comprise determining Whether the hydrogen storage system and the vehicle satisfy the diagnosis start condition when there is no failure in the valve and the sensor, when the SOF of the hydrogen tank is equal to or greater than a predetermined reference fuel amount, and when a parking time duration is within a predetermined parking time duration.

The determining of whether the hydrogen leak has occurred may comprise comparing, by the processor configured therefore, the first SOF with the second SOF, and diagnosing, by the processor, that the hydrogen leak has occurred when a difference between the first SOF and the second SOF is greater than or equal to a predetermined reference value.

The determining of whether the hydrogen leak has occurred may comprise comparing, by the processor configured therefore, the first SOF with the second SOF, and diagnosing, by the processor, that the hydrogen leak has occurred when a ratio between the first SOF and the second SOF is smaller than or equal to a predetermined ratio.

The hydrogen leak sensing method for the fuel cell vehicle may further comprise outputting, by the processor, a warning when it is determined that the hydrogen leak has occurred. The outputting of the warning may include displaying, by the processor, a failure code on a display, and inhibiting, by the processor, a fuel cell system from starting.

Other aspects are disclosed infra.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
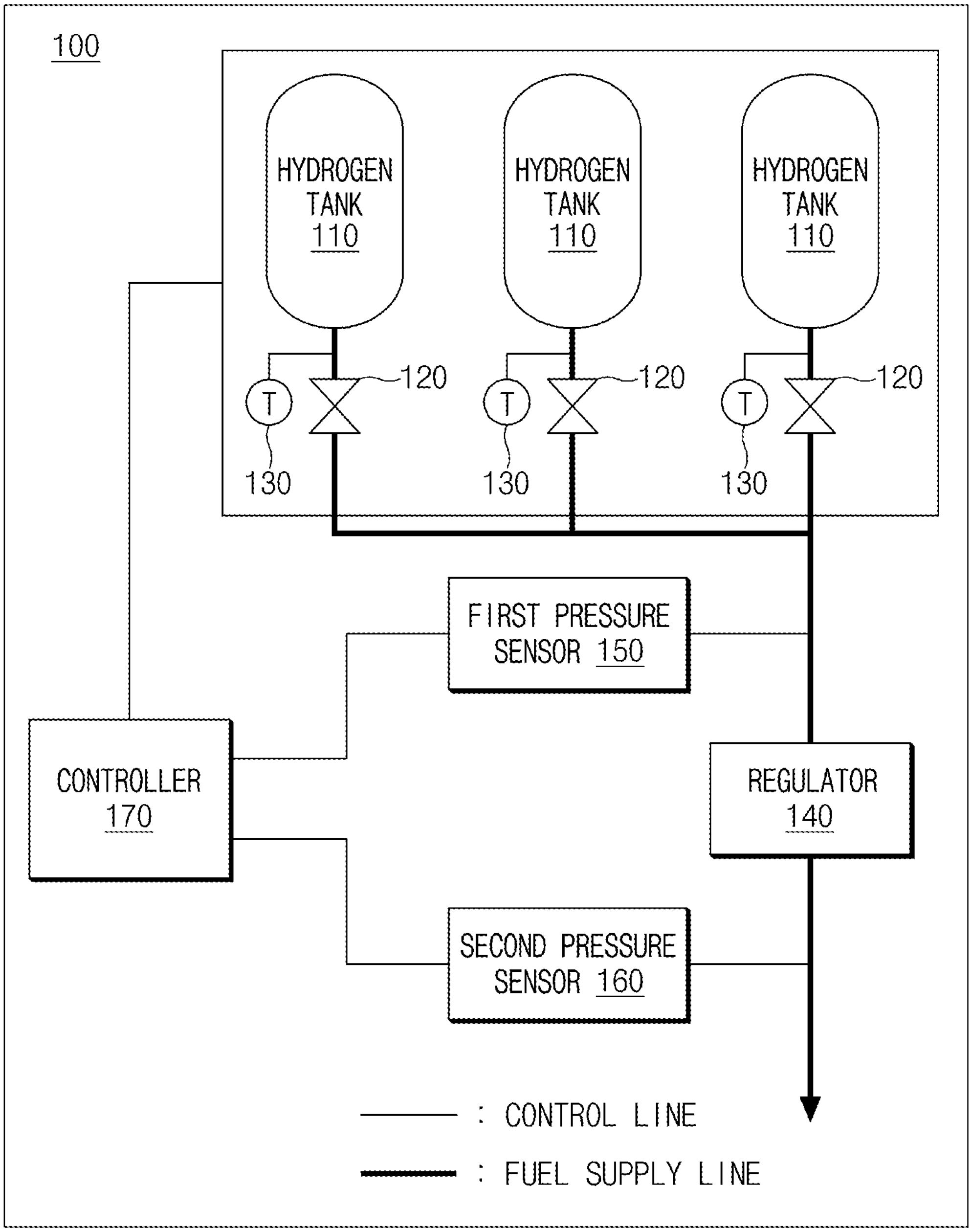
FIG. 1 is a configuration diagram showing a hydrogen storage system according to exemplary embodiments of the present disclosure.

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of the related known configuration or function will be omitted when it is determined that it interferes with the understanding of the embodiment of the present disclosure.

In describing the components of the exemplary embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

FIG. 1 is a configuration diagram showing a hydrogen storage system according to exemplary embodiments of the present disclosure.

Referring to FIG. 1, a hydrogen storage system 100 may supply hydrogen to generate electrical energy in a fuel cell stack in a fuel cell vehicle. The hydrogen storage system 100 may comprise a hydrogen tank 110, a valve 120, a temperature sensor 130, a regulator 140, a first pressure sensor 150, a second pressure sensor 160 and a controller (or a hydrogen storage system controller) 170.

The hydrogen tank 110 may store therein hydrogen used as fuel for the fuel cell vehicle. The hydrogen tank 110 may store hydrogen gas compressed at high pressure. The hydrogen tank 110 may be made of a carbon fiber reinforced composite that may withstand the high pressure. Although three hydrogen tanks 110 are shown to be mounted in the drawing, a design is not limited thereto and may change. For example, at least one, two, or four hydrogen tanks 110 may be mounted.

The valve 120 may open or shut off a flow path of hydrogen gas from the hydrogen tank 110 to a fuel cell stack (not shown). The valve 120 acts as a tank valve installed at an outlet end of the hydrogen tank 110, and may be closed or opened according to a command from the controller 170. The valve 120 may be implemented as a solenoid valve.

The temperature sensor 130 may be installed inside the hydrogen tank 110, and may measure a temperature of hydrogen stored in the hydrogen tank 110. The temperature sensor 130 may transmit the measured temperature information to the controller 170. The temperature sensor 130 may receive power at all times.

The regulator 140 may convert high pressure (e.g., 700 bar) hydrogen gas output from the hydrogen tank 110 to predetermined low pressure hydrogen gas. The regulator 140 may supply the depressurized hydrogen to the fuel cell stack (not shown).

The first pressure sensor 150 may be mounted on a pipe (fuel supply line) connecting the hydrogen tank 110 to the regulator 140. The first pressure sensor 150 may measure a pressure of hydrogen in the pipe. In other words, the first pressure sensor 150 may measure a pressure (hydrogen pressure) of the hydrogen flowing into the regulator 140. The first pressure sensor 150 may be implemented as a high pressure sensor.

The second pressure sensor 160 may be mounted on a pipe connected to an output side of the regulator 140. The second pressure sensor 160 may measure a pressure of hydrogen decompressed by the regulator 140. The second pressure sensor 160 may be implemented as a middle pressure sensor.

The controller 170 may refer to Hydrogen storage system Management Unit (HMU) and may control all operations of the hydrogen storage system 100. When the controller 170 receives a wake-up signal in a state in which power is not supplied thereto, the controller 170 may wake-up and perform hydrogen leak sensing logic. The wake-up signal may be received from a comparator (not shown). The comparator may compare an outside air temperature with an internal temperature of the hydrogen tank measured by the temperature sensor 130. When a deviation between the internal temperature and the outside air temperature is greater than a predetermined level, the comparator may issue the wake-up signal.

The controller 170 may control opening and closing of the valve 120 according to a driving cycle to supply or shut off hydrogen to the fuel cell stack (not shown). The controller 170 may monitor a hydrogen state of the hydrogen storage system 100 using at least one of the temperature sensor 130, the first pressure sensor 150, or the second pressure sensor 160. The controller 170 may diagnose a failure of the hydrogen storage system 100 based on the monitoring result. When the failure is diagnosed, the controller 170 may perform a fail safe operation on the diagnosed failure. The controller 170 may comprise at least one processor. The at least one processor may comprise at least one of Application Specific Integrated Circuit (ASIC), Digital Signal Processor (DSP), Programmable Logic Device (PLD), Field Programmable Gate Array (FPGA), Central Processing unit (CPU), a microcontroller and/or a microprocessor.

Figure 2:
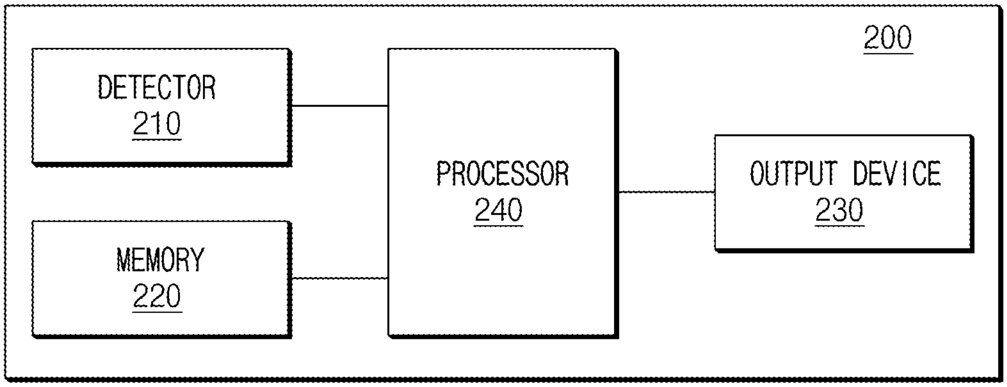
FIG. 2 is a block diagram illustrating a hydrogen leak sensing device for a fuel cell vehicle according to exemplary embodiments of the present disclosure.

FIG. 2 is a block diagram illustrating a hydrogen leak sensing device for a fuel cell vehicle according to exemplary embodiments of the present disclosure.

Referring to FIG. 2, a hydrogen leak sensing device 200 for the fuel cell vehicle may comprise a detector 210, a memory 220, an output device 230, and a processor 240 (the controller 170 shown in FIG. 1).

The detector 210 may detect hydrogen status information of the hydrogen storage system 100. The detector 210 may acquire the hydrogen state information using at least one of sensors such as a temperature sensor, a pressure sensor, a mass sensor, or a flow sensor. The hydrogen state information may comprise information such as a temperature, a pressure, a mass and flow (flow rate) of hydrogen.

The memory 220 may store therein the hydrogen state information and/or a state of fuel (SOF) and the like. The memory 220 may store therein the hydrogen leak sensing logic. The memory 220 may be a non-transitory storage medium that stores therein instructions executed by the processor 240. The memory 220 may comprise at least one of storage media such as a flash memory, a hard disk, Solid State Disk (SSD), Secure Digital (SD) card, Random Access Memory (RAM), Static Random Access Memory (SRAM), Read Only Memory (ROM), Programmable Read Only Memory (PROM), Electrically Erasable and Programmable ROM (EEPROM) and Erasable and Programmable ROM (EPROM).

The output device 230 may output a failure diagnosis result (e.g., a failure code) as visual information and/or auditory information. For example, the output device 230 may output the failure diagnosis result using a telematics system (TMS) such as Blue Link so that an alarm may be provided to a user. The output device 230 may comprise a display and sound output module. The display may comprise at least one of display devices such as a liquid crystal display (LCD), a thin-film transistor liquid crystal display (TFT-LCD), an organic light-emitting diode (OLED) display and a cluster, etc. The sound output module may comprise a receiver, a speaker, and/or a buzzer, and the like.

The processor 240 may determine whether the hydrogen leak has occurred based on a comparing result between the hydrogen status information in the hydrogen storage system 100 before and after starting the fuel cell system. The processor 240 may switch the valve 120 of the hydrogen tank 110 to a closed state depending on the driving cycle. The processor 240 may obtain (calculate) a SOF (first SOF) immediately after the valve closes in an immediately previous driving cycle, and store the first SOF in the memory 220. The processor 240 may calculate the first SOF using the hydrogen state information detected by the detector 210.

The processor 240 may open the valve 120 of hydrogen tank 110 according to a current driving cycle. In other words, the processor 240 may start hydrogen supply in the current driving cycle.

The processor 240 may determine whether a diagnosis start condition is satisfied after the valve 120 of the hydrogen tank 110 is opened. When there is no malfunction of the valve 120 and the first pressure sensor 150, and the SOF in the hydrogen tank 110 is equal to or grater than a predetermined reference fuel amount (e.g., 10%), and a parking time is within a reference parking time (e.g., 72 hours), the processor 240 may determine that the diagnosis start condition is satisfied. The reference fuel amount may be set as a fuel amount level which may be guaranteed in consideration of a sensor error. The reference parking time may be set to prevent mis-detection due to SOF fluctuation due to the hydrogen leak.

The processor 240 may calculate a second SOF when the condition for starting the diagnosis is satisfied. The processor 240 may calculate the second SOF using the hydrogen state information detected by the detector 210. For example, the processor 240 may calculate the second SOF using the temperature and the pressure of hydrogen. In another example, the processor 240 may calculate the second SOF using the mass of hydrogen. In this connection, the processor 240 may use the mass of hydrogen measured by a mass sensor or the mass of hydrogen calculated using the temperature and the pressure of hydrogen. In another example, the processor 240 may calculate the second SOF using temperature change according to a flow rate of hydrogen. The processor 240 may calculate the second SOF at a timing when a predetermined time duration has elapsed after the valve 120 is opened, and then, may store the second SOF in the memory 220. The predetermined time duration may be a time duration for which a pressure is sufficiently supplied to the pipe after opening the valve 120, and may be, for example, 2 seconds.

The processor 240 may compare the first SOF with the second SOF and diagnose whether there is a failure based on the comparison result. The processor 240 may determine that a large amount of hydrogen leak has occurred when a SOF ratio between the first SOF and the second SOF, that is, the second SOF/the first SOF is smaller than a predetermined ratio, for example, 2/3. The processor 240 may determine that a large amount of hydrogen leakage has occurred when a deviation (difference) between the first SOF and the second SOF is greater than or equal to a predetermined reference value.

The processor 240 may display a failure code on the display when the failure is diagnosed. The processor 240 may inhibit the fuel cell system from starting, and may output information indicating the hydrogen leak, such as a beep, a warning message, etc., to the output device 230.

The processor 240 may start the fuel cell system normally unless the failure is diagnosed. In other words, the processor 240 may permit normal start-up of the fuel cell system when it determines that the failure of the hydrogen storage system 100 is not diagnosed.

The processor 240 may perform the hydrogen leak sensing logic when the SOF of the hydrogen tank 110 is not in an overcharged state. That is, when the SOF of the hydrogen tank 110 is in the overcharged state, the processor 240 cannot perform the hydrogen leak sensing logic.

Figure 3:
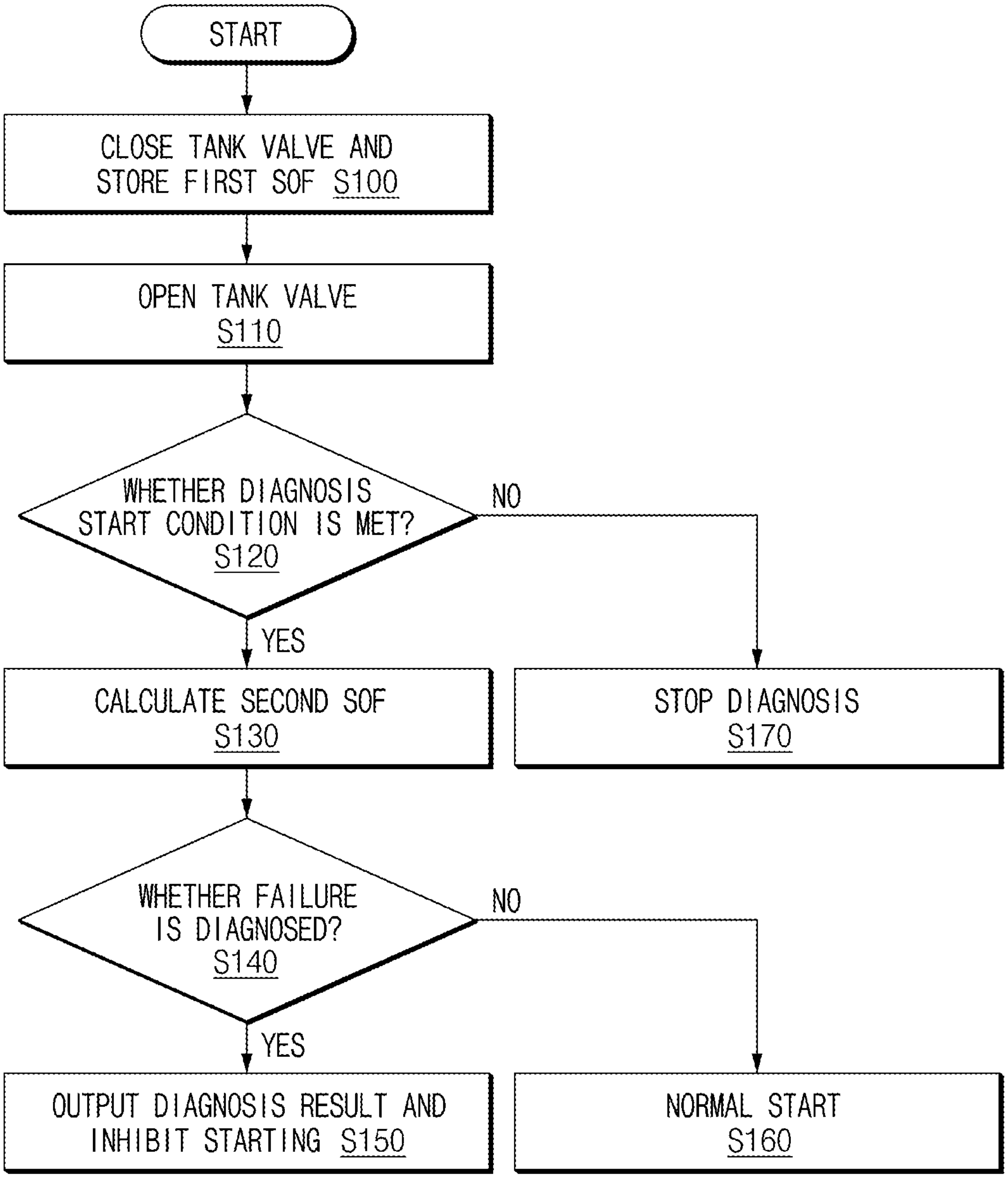
FIG. 3 is a flowchart illustrating a hydrogen leak sensing method for a fuel cell vehicle according to exemplary embodiments of the present disclosure.

FIG. 3 is a flowchart illustrating a hydrogen leak sensing method for a fuel cell vehicle according to exemplary embodiments of the present disclosure.

Referring to FIG. 3, the processor 240 may close the valve 120 of the hydrogen tank 110 according to the driving cycle, and may store the SOF, that is, the first SOF immediately after the valve 120 of the hydrogen tank 110 is closed in S100. The processor 240 may switch the valve 120 of the hydrogen tank 110, that is, the tank valve from an open state to a closed slate at an end timing of the immediately previous driving cycle. In this connection, the processor 240 may calculate the SOF (the first SOF) of the hydrogen tank 110 immediately after closing the valve in the immediately previous driving cycle and store the first SOF in the memory 220.

The processor 240 may open the valve 120 of the hydrogen tank 110 according to the driving cycle in S110. The processor 240 may open the valve 120 when the current driving cycle begins.

The processor 240 may determine whether the hydrogen storage system 100 and the vehicle satisfy the diagnosis start condition in S120. The processor 240 may determine that the diagnosis start condition is satisfied when there is no malfunction in the valve 120 and the sensor such as the first pressure sensor 150 of the hydrogen storage system 100, when the SOF is greater than or equal to a preset reference fuel amount, and when the parking time duration is within a preset parking time duration. When at least one of following conditions is not met: a condition that there is no failure in the valve 120 and the first pressure sensor 150 of the hydrogen storage system 100, a condition that the SOF is equal to or greater than the predetermined reference fuel amount and a condition that the parking time duration is within the predetermined parking time duration, the processor 240 may determine that the diagnosis start condition is not satisfied.

The processor 240 may calculate the second SOF when the diagnosis start condition is satisfied in S130. The processor 240 may calculate the SOF immediately after the valve 120 of the hydrogen tank 110 is opened and store the calculated SOF in the memory 220. The processor 240 may acquire information about the hydrogen state of the hydrogen storage system 100 through the detector 210. The hydrogen state information may comprise at least one of information such as the temperature, the pressure, the mass or the flow of hydrogen. The processor 240 may calculate the SOF using the temperature and the pressure thereof. Further, the processor 240 may calculate the SOF using the mass of hydrogen. Further, the processor 240 may calculate the SOF based on the temperature change according to the flow of hydrogen.

The processor 240 may compare the first SOF and the second. SOF with each other and perform failure diagnosis based on the comparison result in S140. The processor 240 may diagnose the failure when the ratio between the first SOF and the second SOF is smaller than or equal to a predetermined ratio. To the contrary, the processor 240 may diagnose non-failure when the ratio between the first SOF and the second SOF exceeds the predetermined ratio. The processor 240 compares the first SOF and the second SOF with each other. When a difference therebetween is greater than a predetermined level, the processor 240 may determine that a large amount of hydrogen leak has occurred.

When the processor 240 diagnoses the failure, the processor 240 may output the diagnosis result and may inhibit the fuel cell system from starting in S150. The processor 240 may display the failure code on the display and may output a warning sound and the like through the speaker. Further, the processor 240 may output a warning to the output device 230 indicating that the large amount of hydrogen leak has occurred.

When the failure is not diagnosed, the processor 240 may allow a normal start-up of the fuel cell system in S160. The processor 240 may control the hydrogen storage system 100 to supply the hydrogen to the fuel cell stack when the hydrogen storage system 100 does not fail. Accordingly, the fuel cell stack may generate electric energy using the hydrogen supplied from the hydrogen storage system 100 as fuel.

When the condition for starting the diagnosis is not satisfied in S120, the processor 240 may stop diagnosing the failure in S170. The processor 240 may not perform failure diagnosis when it is determined that the diagnosis start condition is not satisfied.

Figure 4:
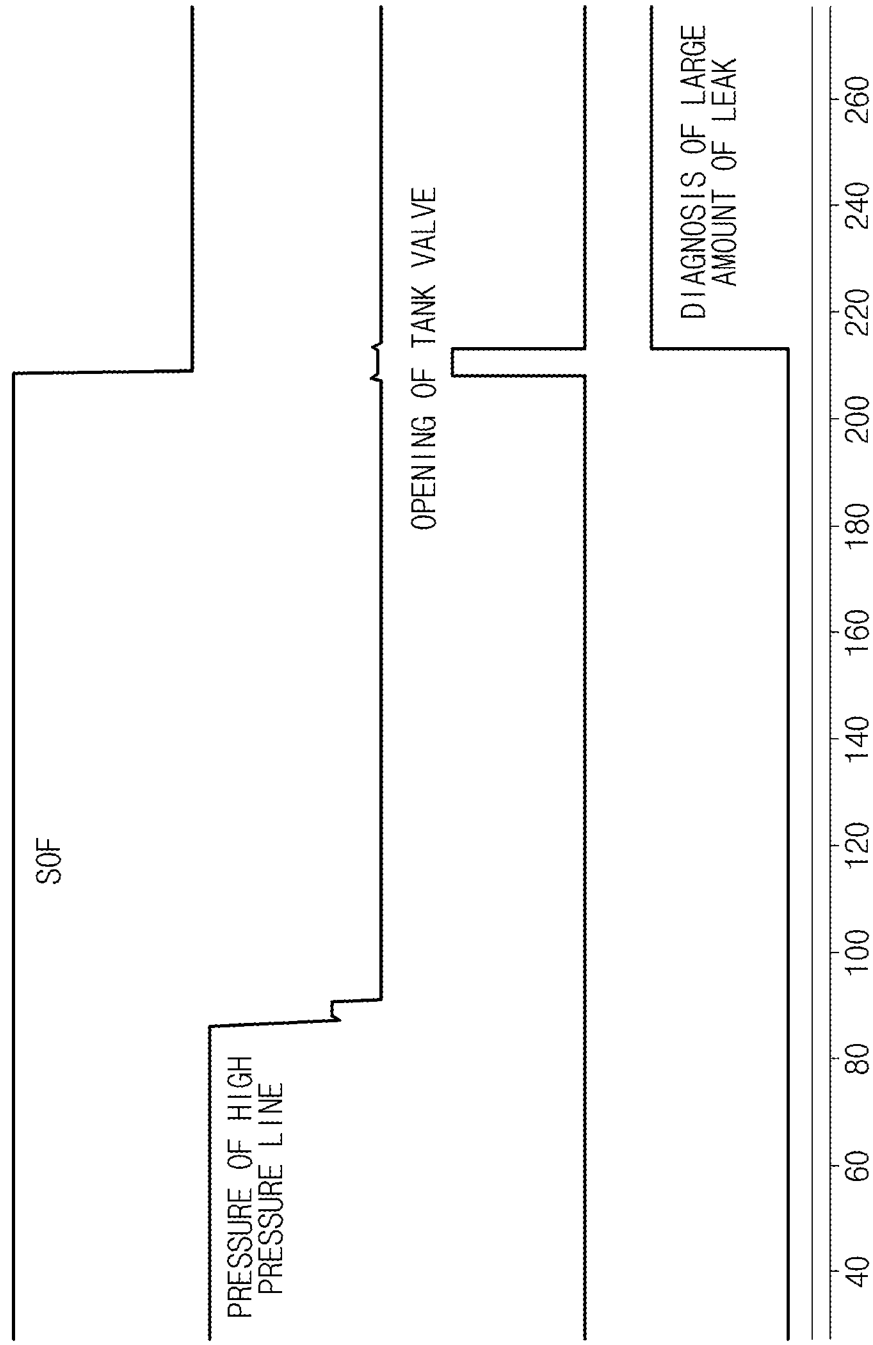
FIG. 4 is a graph showing an example of an hydrogen leak sensing logic operation according to exemplary embodiments of the present disclosure.

FIG. 4 is a graph showing an example of a hydrogen leak sensing logic operation according to exemplary embodiments of the present disclosure.

Referring to FIG. 4, when the valve 120 of the hydrogen tank 110 is closed, the SOF of the hydrogen tank 110 is kept constant, while the hydrogen pressure in a high pressure line (fuel supply line) as measured by the first pressure sensor 150 has a sudden decline. Thereafter, immediately after the valve 120 of the hydrogen tank 110 is opened, the SOF of the hydrogen tank 110 is being decreased rapidly. In this connection, the processor 240 may compare the first SOF immediately after the valve 120 of the hydrogen tank 110 is closed with the second SOF immediately after the valve 120 of the hydrogen tank 110 is opened. The processor 240 may diagnose that a large amount of hydrogen leak has occurred when the difference between the first SOF and the second SOF is greater than or equal to a predetermined level. The processor 240 may output a warning to the output device 230 indicating that the hydrogen leak has occurred.

Figure 5:
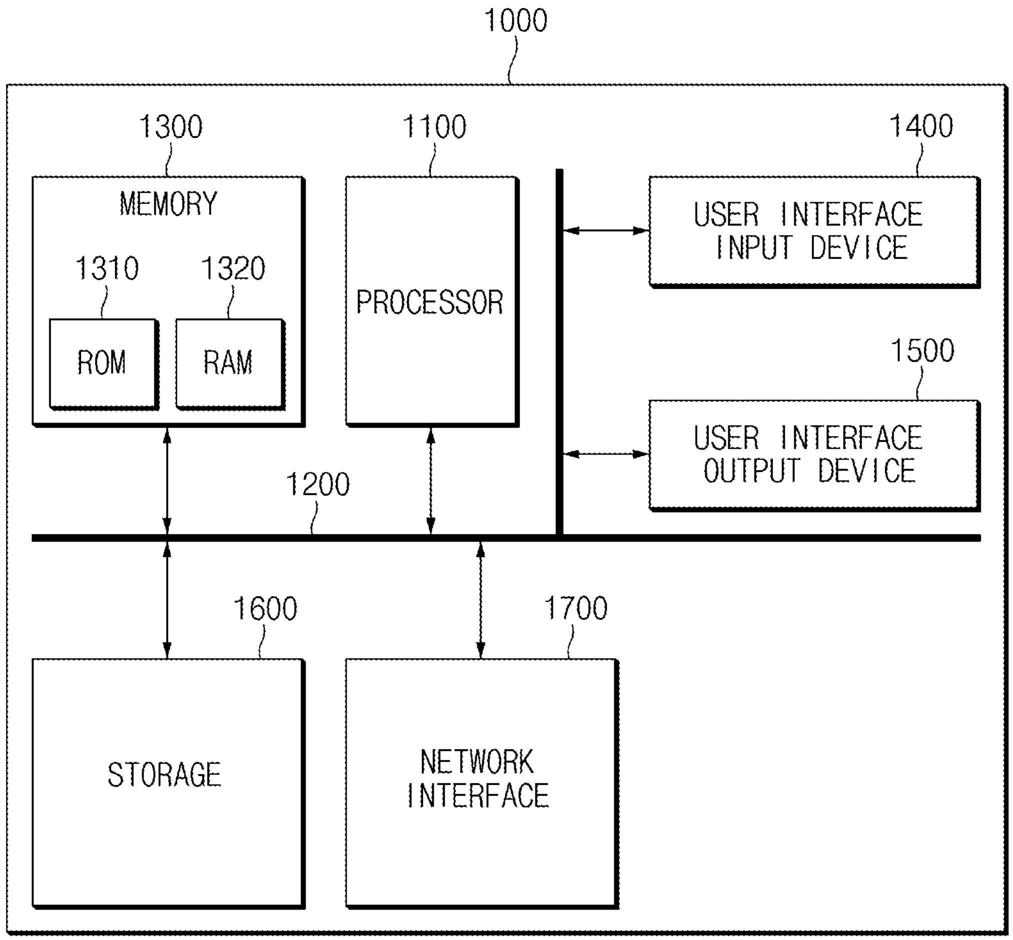
FIG. 5 is a block diagram showing a computing system executing a hydrogen leak sensing method according to exemplary embodiments of the present disclosure.

FIG. 5 is a block diagram showing a computing system executing a hydrogen leak sensing method according to exemplary embodiments of the present disclosure.

Referring to FIG. 5, a computing system 1000 may comprise at least one processor 1100, a memory 1300, a user interface input device 1400, a user interface output device 1500, storage 1600, and a network interface 1700 connected to each other via a bus 1200.

The processor 1100 may be a central processing unit (CPU) or a semiconductor device that processes instructions stored in the memory 1300 and/or the storage 1600. The memory 1300 and the storage 1600 may comprise various types of volatile or non-volatile storage media. For example, the memory 1300 may comprise ROM (Read Only Memory) 1310 and RAM (Random Access Memory) 1320.

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present disclosure, and various modifications and changes may be made by those skilled in the art without departing from the essential characteristics of the present disclosure. Therefore, the exemplary embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and ail technical ideas falling within the scope of the claims should be construed as being included in the scope of the present disclosure.

According to the present disclosure, the failure such as a large amount of hydrogen leak may be detected not only in the controller operating state but also in the controller non-operating state. Thus, a safety diagnosis level of the hydrogen storage system may be increased and the reliability of the system may be increased.

Further, according to the present disclosure, when a hydrogen leak has occurred during parking, the device detects the leak and outputs a warning so that a driver may recognize the leak, and performs a fail safe function according to the occurrence of the hydrogen leak, thereby preventing safety accidents which may otherwise occur due to the hydrogen leak when the controller is not operating.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims

What is claimed is:

1. A hydrogen leak sensing device for a fuel cell vehicle, the device comprising:
- a hydrogen tank configured to store hydrogen gas;
- a regulator configured to depressurize high-pressure hydrogen gas output from the hydrogen tank;
- a pressure sensor configured to mount on a fuel supply line connecting the hydrogen tank to the regulator;
- a temperature sensor, alone or in combination with a mass sensor, or a flow sensor, each configured to detect information regarding the hydrogen tank, wherein the temperature sensor is installed inside the hydrogen tank and configured to measure an internal temperature of the hydrogen tank;
- a processor operably coupled to the hydrogen tank, the regulator, and the sensor(s), and configured to control a valve of the hydrogen tank;
- wherein the processor is configured to:
  - receive a wake-up signal in a state in which power is not supplied to the processor when a deviation between the internal temperature of the hydrogen tank and an air temperature outside the hydrogen tank is greater than a predetermined level;
  - calculate, by executing stored instructions, a first state of fuel (SOF) of the hydrogen tank based on one of a measured temperature, a measured pressure, a measured mass, or a measured flow of hydrogen immediately after the valve is closed, and calculate, by executing stored instructions, a second SOF of the hydrogen tank based on one of a measured temperature, a measured pressure, a measured mass, or a measured flow of hydrogen after a predetermined time duration has elapsed after the valve is opened; and determine via a hardware-implemented comparison whether a hydrogen leak has occurred in the hydrogen tank based on the calculated first and second SOFs, wherein the valve is a tank valve installed at an outlet end of the hydrogen tank, and wherein the processor is further configured to control a fuel cell system by inhibiting the fuel cell system from starting upon determining that the hydrogen leak has occurred.

2. The device of claim 1, wherein the device further comprises a detector for detecting hydrogen state information using at least one of the temperature sensor, the pressure sensor, the mass sensor, or the flow sensor.

3. The device of claim 1, wherein the processor is configured to:

calculate the first SOF when the valve is closed and store the first SOF;

determine whether a hydrogen storage system and the vehicle satisfy a diagnosis start condition when the valve is opened;

upon determination that the diagnosis start condition is satisfied, calculate the second SOF and store the calculated second SOF.

4. The device of claim 3, wherein the processor is configured to determine that the diagnosis start condition is satisfied when there is no failure in the valve and the pressure sensor, when the first SOF of the hydrogen tank is equal to or greater than a predetermined reference fuel amount, and when a parking time duration is within a predetermined parking time duration.

5. The device of claim 3, wherein the processor is configured to compare the first SOF with the second SOF, and diagnose that the hydrogen leak has occurred when a difference between the first and second SOFs is greater than or equal to a predetermined reference value.

6. The device of claim 3, wherein the processor is configured to compare the first SOF with the second SOF, and diagnose that the hydrogen leak has occurred when a ratio between the first SOF and the second SOF is smaller than or equal to a predetermined ratio.

7. The device of claim 1, wherein the processor is configured to:

output a warning upon determination that the hydrogen leak has occurred; and when outputting the warning, display a failure code on a display.

8. A hydrogen leak sensing method for a fuel cell vehicle having a hydrogen tank configured to store hydrogen gas, the method comprising:

receiving, by a processor, a wake-up signal in a state in which power is not supplied to the processor when a deviation between an internal temperature of the hydrogen tank and an air temperature outside the hydrogen tank is greater than a predetermined level;

closing a valve of the hydrogen tank and calculating, via the processor executing stored instructions, a first SOF of the hydrogen tank using one of a measured temperature, a measured pressure, a measured mass, or a measured flow of hydrogen immediately after the valve closes;

opening the valve of the hydrogen tank and calculating, via the processor, a second SOF of the hydrogen tank based on one of a measured temperature, a measured pressure, a measured mass, or a measured flow of hydrogen after a predetermined time duration has elapsed after the valve is opened; and hardware-implemented comparing of the first SOF with the second SOF, and diagnosing that a hydrogen leak has occurred when a difference or ratio therebetween exceeds a predetermined threshold, wherein, upon diagnosing the hydrogen leak, the method further comprises controlling, by the processor, a fuel cell system in communication with a fuel supply line by inhibiting the fuel cell system from starting.

9. The method of claim 8, wherein calculating the first and second SOF comprises:

calculating and storing, by the processor, the first SOF when the valve is closed;

determining, by the processor, whether a hydrogen storage system and the vehicle satisfy a diagnosis start condition when the valve is opened; and calculating and storing, by the processor, the second SOF when the diagnosis start condition is satisfied.

10. The method of claim 9, wherein determining whether the hydrogen storage system and the vehicle satisfy the diagnosis start condition comprises:

determining whether the hydrogen storage system and the vehicle satisfy the diagnosis start condition when there is no failure in the valve and a pressure sensor, when the first SOF of the hydrogen tank is equal to or greater than a predetermined reference fuel amount, and when a parking time duration is within a predetermined parking time duration.

11. The method of claim 9, wherein determining whether the hydrogen leak has occurred comprises:

comparing, by the processor, the first SOF with the second SOF; and diagnosing, by the processor, that the hydrogen leak has occurred when a difference between the first SOF and the second SOF is greater than or equal to a predetermined reference value.

12. The method of claim 9, wherein determining whether the hydrogen leak has occurred comprises:

comparing, by the processor, the first SOF with the second SOF; and diagnosing, by the processor, that the hydrogen leak has occurred when a ratio between the first SOF and the second SOF is smaller than or equal to a predetermined ratio.

13. The method of claim 8, further comprises:

outputting, by the processor, a warning when it is determined that the hydrogen leak has occurred, wherein outputting the warning comprises displaying, by the processor, a failure code on a display.

* * * * *